US011257255B2

(12) United States Patent
Lee et al.

(10) Patent No.: US 11,257,255 B2
(45) Date of Patent: Feb. 22, 2022

(54) DOMAIN MATCHING METHODS FOR TRANSPORTABLE IMAGING APPLICATIONS

(71) Applicant: Leica Microsystems CMS GmbH, Wetzlar (DE)

(72) Inventors: Shih-Jong James Lee, Bellevue, WA (US); Hideki Sasaki, Bellevue, WA (US)

(73) Assignee: Leica Microsystems CMS GmbH, Wetzlar (DE)

( * ) Notice: Subject to any disclaimer, the term of this patent is extended or adjusted under 35 U.S.C. 154(b) by 273 days.

(21) Appl. No.: 16/702,294

(22) Filed: Dec. 3, 2019

(65) Prior Publication Data
US 2021/0166433 A1      Jun. 3, 2021

(51) Int. Cl.
| | |
|---|---|
| *G06T 9/00* | (2006.01) |
| *G06N 20/00* | (2019.01) |
| *G06N 3/08* | (2006.01) |
| *G06T 3/40* | (2006.01) |

(52) U.S. Cl.
CPC ............. *G06T 9/002* (2013.01); *G06N 3/084* (2013.01); *G06N 20/00* (2019.01); *G06T 3/4046* (2013.01)

(58) Field of Classification Search
CPC ....... G06T 9/002; G06T 3/4046; G06N 20/00; G06N 3/084; G06N 3/0454
See application file for complete search history.

(56) References Cited

U.S. PATENT DOCUMENTS

| | | | | |
|---|---|---|---|---|
| 8,332,334 | B2 * | 12/2012 | Long | G06N 20/00 |
| | | | | 706/12 |
| 10,296,846 | B2 * | 5/2019 | Csurka | G06N 3/0454 |
| 2018/0307947 | A1 * | 10/2018 | Choi | G06T 11/60 |
| 2020/0356712 | A1 * | 11/2020 | Rejeb Sfar | G06N 3/0472 |

(Continued)

FOREIGN PATENT DOCUMENTS

| | | | |
|---|---|---|---|
| CN | 111814854 A | * | 10/2020 |
| CN | 111860130 A | * | 10/2020 |

(Continued)

OTHER PUBLICATIONS

Li, Y., Murias, M. A., Major, S., Dawson, G., & Carlson, D. E. (2018). Extracting relationships by multi-domain matching. Advances in Neural Information Processing Systems, Dec. 2018, 6798-6809. (Year: 2018).*

(Continued)

*Primary Examiner* — Charles T Shedrick
(74) *Attorney, Agent, or Firm* — 2SPL Patent Attorneys PartG mbB; Yong Beom Hwang

(57) ABSTRACT

A computerized domain matching image conversion method for transportable imaging applications first performs a target domain A to source domain B matching converter training by computing means using domain B training images and at least one domain A image to generate an A to B domain matching converter. The method then applies the A to B domain matching converter to a domain A application image to generate its domain B matched application image. The method further applies a domain B imaging application analytics to the domain B matched application image to generate an imaging application output for the domain A application image.

23 Claims, 6 Drawing Sheets

(56) References Cited

U.S. PATENT DOCUMENTS

| | | | |
|---|---|---|---|
| 2021/0012162 A1* | 1/2021 | Huang | G06N 3/0427 |
| 2021/0012486 A1* | 1/2021 | Huang | G06T 7/0012 |
| 2021/0217405 A1* | 7/2021 | Li | G06F 40/169 |

FOREIGN PATENT DOCUMENTS

| | | | | |
|---|---|---|---|---|
| CN | 111931815 A | * | 11/2020 | |
| CN | 112380881 A | * | 2/2021 | |
| CN | 102020215942 A1 | * | 7/2021 | G06N 3/088 |
| DE | 107909101 A | * | 4/2018 | |
| WO | WO-2021131911 A1 | * | 7/2021 | G06T 7/00 |

OTHER PUBLICATIONS

Mingsheng Long, Han Zhu, Jianmin Wang, Michael I. Jordan: Unsupervised Domain Adaptation with Residual Transfer Networks. NIPS 2016: 136-144 (Year: 2016).*

Sun, Qian & Chattopadhyay, Rita & Panchanathan, Sethuraman & Ye, Jieping. (2011). A Two-Stage Weighting Framework for Multi-Source Domain Adaptation. Advances in Neural Information Processing Systems. (Year: 2011).*

* cited by examiner

DOMAIN MATCHING METHODS FOR TRANSPORTABLE IMAGING APPLICATIONS

STATEMENT AS TO RIGHTS TO INVENTIONS MADE UNDER FEDERALLY SPONSORED RESEARCH AND DEVELOPMENT

This work was supported in part by U.S. Government grant number 5R44NS097094-04, awarded by the NATIONAL INSTITUTE OF NEUROLOGICAL DISORDERS AND STROKE and 1R44MH121167-01, awarded by the NATIONAL INSTITUTE OF MENTAL HEALTH. The U.S. Government may have certain rights in the invention.

BACKGROUND OF THE INVENTION

Field of the Invention

The present invention relates to deep model learning and training. More particularly, the present invention relates to computerized methods of domain matching image and analytics conversion for transportable imaging applications.

Description of the Related Art a. Description of Problem that Motivated Invention

Imaging applications covering a wide range of capabilities such as image enhancement/restoration, boundary segmentation, object detection, feature measurements, pattern recognition and computer vision, etc. These are undergoing unprecedented growth due to the new generations of computing hardware, storage, Artificial Intelligence (AI) software and sensor technologies. Nowadays, imaging application analytics that embed data flow and processing algorithms into solution pipelines for intended applications can be found in broad application fields such as manufacturing, electronics, automotive, aerospace, biomedical researches, pre-clinical and clinical diagnostics/treatments, drug discoveries/developments and pharmaceutics, etc.

Deep Learning (DL) is a type of AI which has recently seen a rise in popular interest. This sudden boost has been fueled primarily by the invention of Convolutional Neural Networks (CNNs), a novel machine learning algorithmic architecture as well as the availability of powerful and relatively cheap computing units such as GPUs, TPUs. In the early 2010's CNNs became increasingly prominent as tools for image classification, showing superhuman accuracy at identifying objects in images.

CNNs have been shown to be particularly well suited for imaging applications. Recently, a growing amount of studies have used CNNs to analyze image data, laying the foundation for a fundamental change in how imaging applications are performed and how imaging data is interpreted. The areas where AI has been applied include image restoration, such as denoising and resolution enhancement, extraction of structures from label-free microscopy imaging, i.e. virtual staining and automated, accurate classification and segmentation of microscopy images, the tracking of time-lapse images, etc.

Many of the new generation imaging application analytics incorporate DL models for sophisticated applications. However, these analytics have not been widely adapted to new imaging applications. The delay between methodology developments and their adoption is due to several practical hurdles and challenges. While performance, versatility, and speed of CNNs are likely to continue improving, pre-trained DL models and general imaging application analytics often have the transportability issues—their performance drops when applied to another dataset. That is, data from different experimental and imaging conditions (called "domains"). This challenge has had greatly hindered the fast deployment of imaging application analytics for diverse applications. A method that match image domains for analytics are needed for transportable imaging application analytics.

b. How Did Prior Art Solve Problem?

Prior arts perform image normalization and calibration based on image intensity distributions to match the target domain images to source domain images. These gross image intensity-based approach often fail to preserve/match the application critical features. For DL and machine learning based imaging application analytics, prior arts perform transfer learning to pre-trained deep models or machine learning models for improving transportability. Transfer learning leverages existing annotations or datasets in source domains to quickly build models for a target domain with few annotations and low data resources. One common way to do this is by fine-tuning the original model. Because the fine-tuned model does not have to learn from scratch, it can generally reach higher performance with much less data and computation time than models that do not use transfer learning. Classic domain adaptation transfer learning methods including instance weighting, instance transfer, instance pruning, transfer self-training, domain-adaptive neural network, and feature augmentation, etc. It is reported that domain adaptation can reduce annotation cost by about 20%. However, transfer learning still requires some annotations of the data from target domain which may or may not be available or practical. Furthermore, a sufficient number of the samples from the target domain is still needed to fine-tune the weights of the models trained from the source domain.

BRIEF SUMMARY OF THE INVENTION a. Objectives/Advantages of the Invention

The primary objective of the invention is to provide a domain matching image conversion method for transportable imaging applications. The secondary objective of the invention is to provide a domain matching analytics creation method for transportable imaging applications. The third objective of the invention is to provide an application enhanced domain matching image conversion method for transportable imaging applications. The fourth objective of the invention is to provide an application enhanced domain matching analytics conversion method for transportable imaging applications. The fifth objective of the invention is to provide unsupervised method (i.e. no target domain data annotation) for transportable imaging applications. The sixth objective of the invention is to provide a method for transportable imaging applications based on a single target domain image. The seventh objective of the invention is to provide a method for transportable imaging applications without any source and target domain image pairing.

b. How does this Invention Solve the Problem?

In one solution of the current invention, we convert the images from target domain to mimic the images from the source domain where the imaging application analytics is created and validated. In this way, the imaging application analytics can be directly applied to the converted images. An alternative solution of the current invention converts the training images from the source domain to match the target domain. The converted training images and their annotation data can then be used to re-train the imaging application analytics to match the target domain. In this way, target domain matching imaging application analytics can be conveniently derived without any training data from the target domain. The domain converter can be trained using as few as just a single image from the target domain without any annotation and any pairing between the source and target domain images. Therefore, our invention can be effectively applied to small batch target domains. Furthermore, the domain conversion training for image and analytics conversion can be enhanced for the specific imaging application analytics. This achieves the optimal conversion results for the specific imaging application.

DETAILED DESCRIPTION OF THE PREFERRED EMBODIMENTS

The concepts and the preferred embodiments of the present invention will be described in detail in the following in conjunction with the accompanying drawings.

Figure 1:
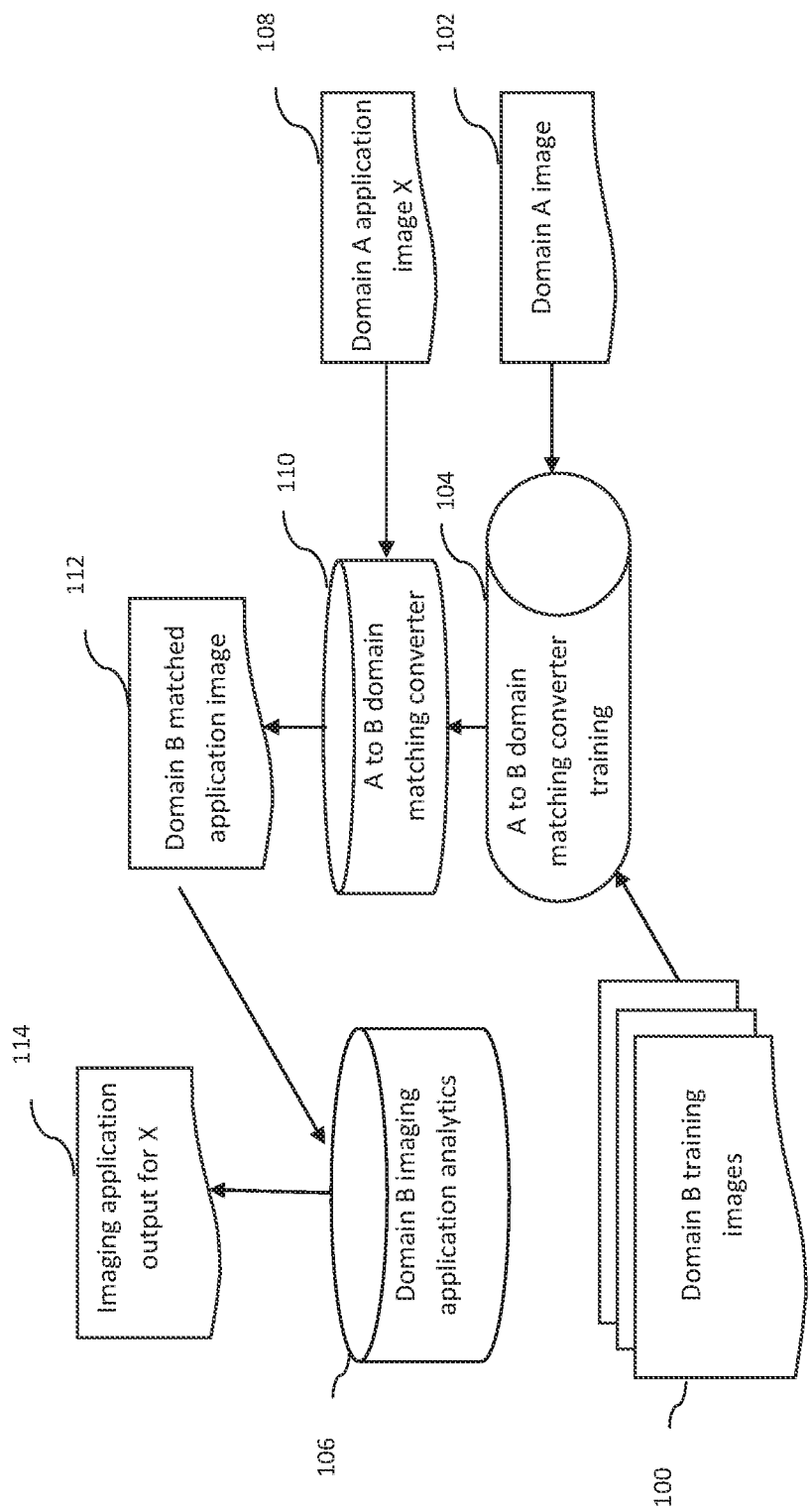
FIG. 1 shows the processing flow of the domain matching image conversion method for transportable imaging applications according to the present invention.

1. Domain Matching Image Conversion Method for Transportable Imaging Applications FIG. 1 shows the processing flow of the domain matching image conversion method for transportable imaging applications of the current invention. A plurality of source domain (called "domain B") training images 100 and at least one target domain (called "domain A") image 102 are entered into electronic storage means such as computer memories. An A to B domain matching converter training 104 is performed by computing means using the plurality of domain B training images 100 and the at least one domain A image 102 to generate an A to B domain matching converter 110. The computing means include central processing unit (CPU), graphics processing unit (GPU), digital signal processor (DSP) from local and/or cloud platforms and/or mobile devices.

A domain B imaging application analytics 106 and at least one domain A application image X 108 are entered into electronic storage means. The A to B domain matching converter 110 is applied to the at least one domain A application image X 108 to generate at least one domain B matched application image 112. The domain B imaging application analytics 106 is applied to the at least one domain B matched application image 112 to generate at least one imaging application output 114 for the at least one domain A application image X 108.

The individual components and/or steps will be further explained in the following.

1.1. Input Images

Representative domain B images from the training data for the creation of the imaging application analytics are entered as the domain B training images 100. Only images are needed for the training of the domain matching converter. Annotation data used for training the imaging application analytics are not needed in this case. A single representative domain A image 102 will be sufficient for the domain matching converter training. Although more domain A images could yield more stable converters.

1.2. Domain Matching Converter Training

The domain matching converter can map in both directions (A to B and B to A) between the domain A, in which there may only be a single training image and a domain B, for which there is a richer training image set. In one embodiment of the invention, the domain matching converter consists of encoders $E_A$, $E_B$ and decoders $D_A$, $D_B$. The domain B encoder $E_B$ defines a latent space of domain B. The auto encoder of the domain A ($E_A$ and $D_A$) is trained to match both the domain A image and the latent space of domain B. To apply the A to B domain matching converter, we first apply $E_A$ to domain A image and then applying $D_B$ to generate domain B matched image.

To enrich the training samples, the images are augmented through methods such as random rotations and/or translation, etc. for images in domains B and A. That is P(S) for s $\in$ B and P(x) for x $\in$ A. The training includes two phases. In phase 1, the autoencoder for domain B is pre-trained using augmented images of s $\in$ B. In phase 2, the autoencoder for each of the two domains $E_A$, $D_A$, $E_B$, and $D_B$ are jointly trained using augmented images P(S) of s $\in$ B and augmented images P(x) of image x $\in$ A. The autoencoder for domain B is further trained and a separate autoencoder for domain A, initialized as a clone of the pretrained autoencoder of B is trained.

Phase 1 Training

The phase 1 training generates initial $E_B$ and $D_B$ so with the basic requirement that $\forall$ s $\in$ B, s $\cong$ $D_B(E_B(s))$. The loss function $\mathcal{L}^B$ is minimized during the phase 1 training as follows:

$$E^*_B, D^*_B = \arg\min_{E_B, D_B} \mathcal{L}^B(E_B, D_B, P(S)).$$

In one embodiment of the invention, the loss function $\mathcal{L}^B$ is the weighted combination of the reconstruction loss $\mathcal{L}_{REC_B}$ and the variational loss $\mathcal{L}_{VAE_B}$.

$$\mathcal{L}^B = \mathcal{L}_{REC_B} + \lambda_1 \mathcal{L}_{VAE_B}$$

Where $\lambda_1$ is the weight parameter and $\mathcal{L}_{REC_B} = \Sigma_{s \in P(S)} \|D_B(E_B(s)) - s\|_1$, note that $\|u\|_1$ is $L^1$ norm for u.

$$\mathcal{L}_{VAE_B} = \sum_{s \in P(s)} KL(\{E_B(s) \mid s \in P(S)\} \| \mathcal{N}(0, I))$$

$$KL(P \| Q) = \sum_{x \in X} P(x) \log\left(\frac{P(x)}{Q(x)}\right)$$

is the Kullback-Leibler divergence (also called relative entropy) is a measure of how one probability distribution is different from a second, reference probability.

CNNs can be configured and trained for encoders and decoders. Those skilled in the art should recognize that different state-of-the-art CNN architectures (e.g., VGG, ResNet, GoogLeNet, MobileNet, etc.) can be used for the embodiment depending on the memory, speed, and performance requirements.

Phase 2 Training

The phase 2 trains the autoencoder of domain A jointly with the autoencoder of domain B. $E_A$ and $D_A$ are initialized with pretrained initial $E_B$ and $D_B$.

The loss function $\mathcal{L}^{AB}$ is minimized during the phase 2 training as follows:

$$E^*_B, D^*_B, E^*_A, D^*_A = \arg\min_{E_B, D_B} \min_{E_A, D_A} \mathcal{L}^{AB}(E_B, D_B, E_A, D_A, P(S), P(x)).$$

In one embodiment of the invention, the loss function $L^{AB}$ for phase 2 training is the weighted combination of different loss components.

$$\mathcal{L}^{AB} = \mathcal{L}_{REC_B} + \lambda_2 \mathcal{L}_{REC_A} + \lambda_3 \mathcal{L}_{VAE_B} + \lambda_4 \mathcal{L}_{VAE_A} + \lambda_5 \mathcal{L}_{bab\text{-}cycle} + \lambda_6 \mathcal{L}_{aba\text{-}cycle} + \lambda_7 \mathcal{L}_{f\text{-}cycle}$$

Where $\lambda_i$ are the weight parameters, $\mathcal{L}_{REC_B}$ and $\mathcal{L}_{REC_A}$ are reconstruction losses and $\mathcal{L}_{VAE_B}$ and $\mathcal{L}_{VAE_A}$ are variational losses as defined below:

$$\mathcal{L}_{REC_B} = \sum_{s \in P(S)} \|D_B(E_B(s)) - s\|_1,$$

$$\mathcal{L}_{REC_A} = \sum_{t \in P(x)} \|D_A(E_A(t)) - t\|_1$$

$$\mathcal{L}_{VAE_B} = \sum_{s \in P(S)} KL(\{E_B(s) \mid s \in P(S)\} \| \mathcal{N}(0, I)),$$

$$\mathcal{L}_{VAE_A} = \sum_{t \in P(x)} KL(\{E_A(t) \mid t \in P(x)\} \| \mathcal{N}(0, I))$$

$\mathcal{L}_{bab\text{-}cycle}$ and $\mathcal{L}_{aba\text{-}cycle}$ are cycle-consistency losses from domain B to domain A and back, and from A to B and back.

$$\mathcal{L}_{bab\text{-}cycle} = \sum_{s \in P(S)} \|D_B(\overline{E_A}(\overline{D_A}(E_B(s)))) - s\|_1$$

$$\mathcal{L}_{aba\text{-}cycle} = \sum_{t \in P(x)} \|D_A(\overline{E_B}(\overline{D_B}(E_A(t)))) - t\|_1$$

$\mathcal{L}_{f\text{-}cycle}$ is the feature cycle from the encoded version of samples $s \in B$ to samples in A and back to the latent space.

$$\mathcal{L}_{f\text{-}cycle} = \sum_{s \in P(S)} \|E_A(D_A(\overline{E_B}(s))) - \overline{E_B}(s)\|_1$$

In the above terms, the bar is used to indicate that this network is not updated during the backpropogation ("detached") of this loss. Note that no feature loss coming from $x \in A$ is applied. Moreover, during training, we "freeze" the weights of $E_B$ and backpropagate only through $D_A$ and $E_A$. The selective backpropagation ensure that the encoder and decoder of domain A are adapted to the latent space of domain B, and not vice versa. This prevents overfitting by the single or a just few images from the domain A.

1.3. Imaging Application Analytics

The current invention is applicable to a broad range of imaging application analytics such as image processing pipelines for image enhancement/restoration, boundary segmentation, object detection, feature measurements, pattern recognition and computer vision, etc. For example, microscopy image analysis software Aivia offers imaging application analytics (recipes) for 3D electron microscopy analysis, 3D neuron analysis, 3D object analysis, 3D object tracking, calcium oscillation, cell count, cell proliferation, cell tracking, colony analysis, exocytosis detection, filament tracking, neurite outgrowth, nuclei count, nuclei tracking, particle tracking, phase cell tracking, pixel colocalization and wound healing, etc.

Moreover, some imaging application analytics include machine learning processing modules such as random forests, support vector machines or DL models containing multiple layers of artificial neural networks such as Convolutional deep Neural Networks (CNNs), Recurrent Neural Networks (RNNs), Generative Adversarial Networks (GANs) and their variants such as Unet, UNet with residual blocks (ResUNet), deep Residual Channel Attention Networks (RCAN), UNet with densely-connected blocks (DenseUNet), Conditional Adversarial Networks (CAN), Bidirectional LSTM, Ensemble DNN/CNN/RNN, Hierarchical Convolutional Deep Maxout Network, etc.

Those skilled in the art should recognize that other image processing pipelines and machine learning/DL models could be covered by the current invention. For example, a class of DL based image application analytics uses a region-based deep learning model for instance segmentation called Mask R-CNN to detect the bounding boxes and also to generate a pixel-wise segmentation of defects. The Mask R-CNN is the latest in a series of deep-region, proposal-based models for object detection (e.g., R-CNN, Fast R-CNN, Faster R-CNN) that consists of two stages. In the first stage, called the region proposal network, a base CNN extracts a feature map from the input image and predicts a set of class-agnostic box proposals that might contain objects of interest.

Figure 2:
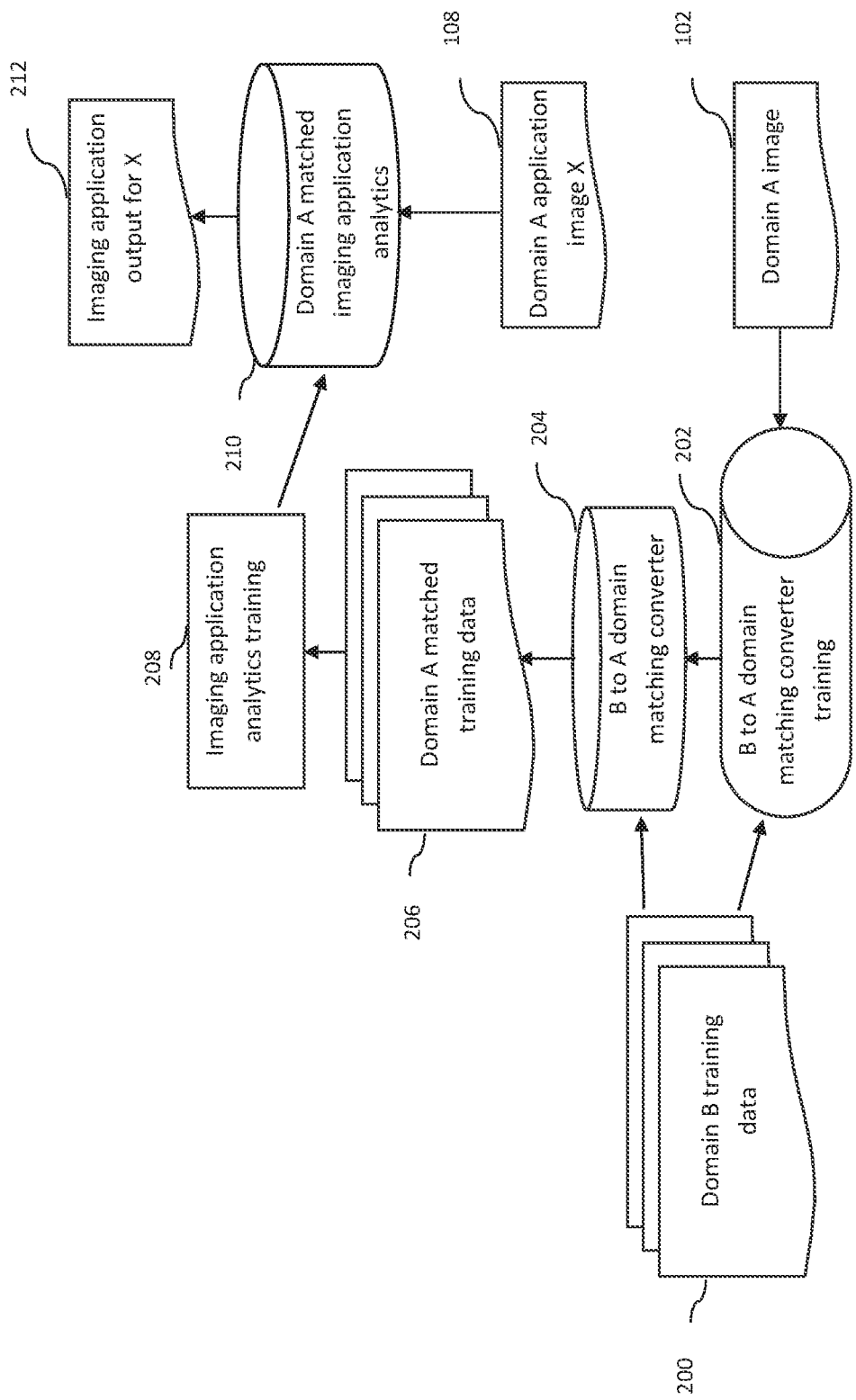
FIG. 2 shows the processing flow of the domain matching analytics creation method for transportable imaging applications according to the present invention.

2. Domain Matching Analytics Creation Method for Transportable Imaging Applications FIG. 2 shows the processing flow of the domain matching analytics creation method for transportable imaging applications of the current invention. A plurality of source domain ("domain B") training data 200 and at least one target domain ("domain A") image 102 are entered into electronic storage means such as computer memories. An B to A domain matching converter training 202 is performed by computing means using the plurality of domain B training data 200 and the at least one domain A image 102 to generate a B to A domain matching converter 204. The B to A domain matching converter 204 is applied to the plurality of domain B training data 200 to generate a plurality of domain A matched training data 206. An imaging application analytics training 208 is performed using the plurality of domain A matched training data 206 to generate a domain A matched imaging application analytics output 210.

At least one domain A application image X 108 are entered into electronic storage means. The domain A matched imaging application analytics 210 is applied to the at least one domain A application image X 108 to generate at least one imaging application output 212 for the least one domain A application image X 108.

The individual components and/or steps will be further explained in the following.

2.1. Domain B Training Data

Domain B training data should include images and truth annotations. The training data sample size should be large enough to train imaging application analytics. In a microscopy image application of the embodiment, the data may include not only images and truth annotations but also metadata such as microscope types, objective lens, excitation light source, intensity, excitation and dichroic filters, emission filters (for florescence microscopy), detector gain and offset, pinhole size, sampling speed/exposure time, pixel dimensions (size, time point, focus position), etc. In addition, the specimen types and conditions such as live, fixed, organelle types, etc. can also be stored as metadata.

2.2. B to A Domain Matching Converter Training

In one embodiment of the invention, the same procedure used for the A to B domain matching converter training can be used for the training since the training is bi-directional. After the training, encoders $E_A$, $E_B$ and decoders $D_A$, $D_B$ are created. To apply the B to A domain matching converter, we first apply $E_B$ to domain B training images contained in the domain B training data 200 and then applying $D_A$ to generate domain A matched training images. The domain B training annotation data can usually be directly used along with B to A converted images for the domain A matched training data 206. In some cases, if the annotation data is domain dependent, the B to A domain matching converter 204 can also be trained for the annotation data conversion.

2.3. Imaging Application Analytics Training

The domain A matched training data 206 can be used to create the imaging application analytics that are domain A compatible. Therefore, a well-established domain B training data can be re-used to create imaging application analytics for domain A. In one embodiment of the invention, the training data is divided into training and validation set for the training of DL model-based imaging application analytics. The training set is used to train the deep models and the validation set is used to evaluate the deep model training status and readiness.

Figure 3:
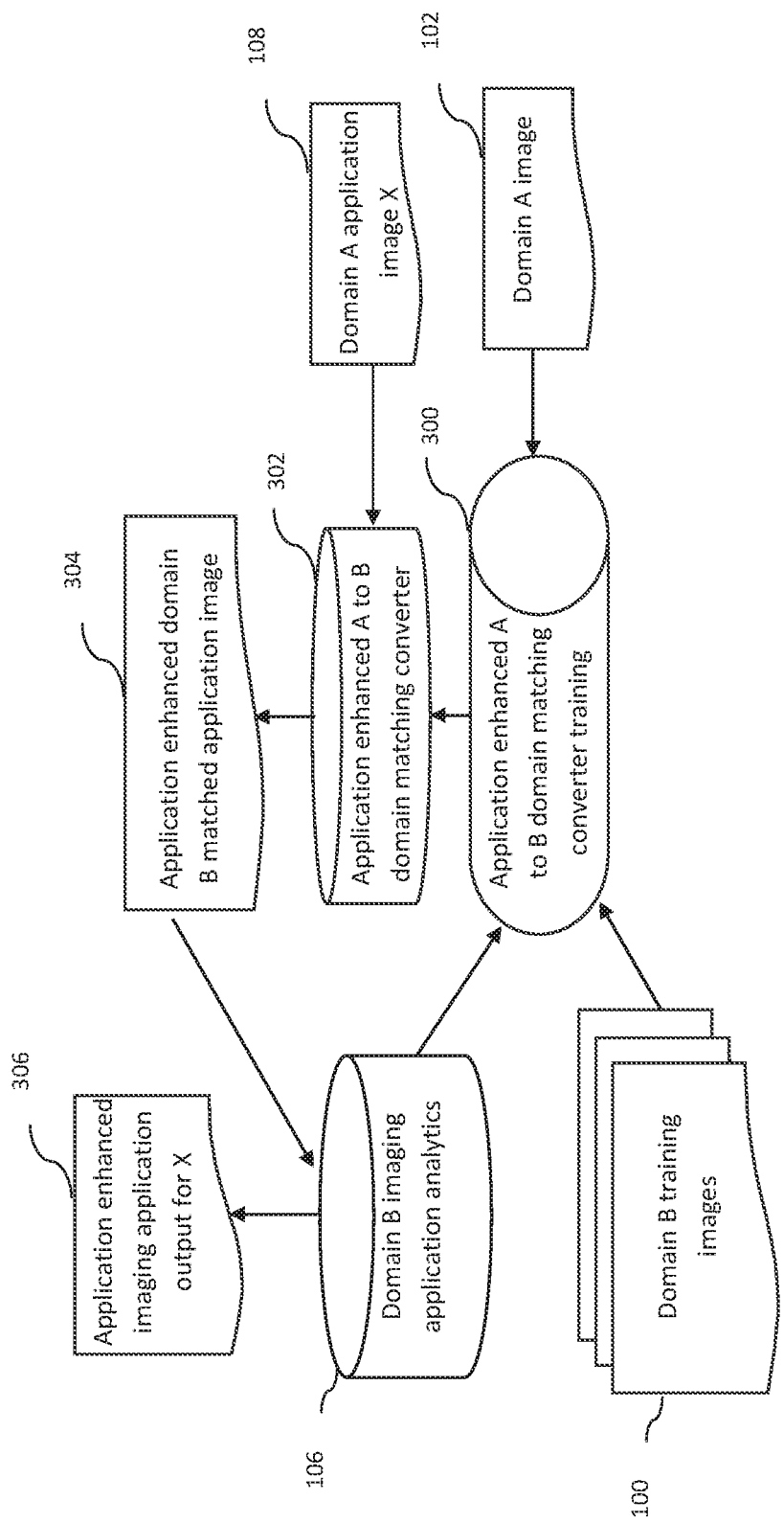
FIG. 3 shows the processing flow of the application enhanced domain matching image conversion method for transportable imaging applications according to the present invention.

3. Application enhanced domain matching image conversion method for transportable imaging applications FIG. 3 shows the processing flow of the application enhanced domain matching image conversion method. A source domain ("domain B") imaging application analytics 106, a plurality of domain B training images 100 and at least one target domain ("domain A") image 102 are entered into electronic storage means. An application enhanced A to B domain matching converter training 300 is performed by computing means using the plurality of domain B training images 100, the domain B imaging application analytics 106 and the at least one domain A image 102 to generate an application enhanced A to B domain matching converter 302. At least one domain A application image X 108 is entered into electronic storage means. The application enhanced A to B domain matching converter 302 is applied to the at least one domain A application image X 108 to generate at least one application enhanced domain B matched application image 304. The domain B imaging application analytics 106 is applied to the at least one application enhanced domain B matched application image 304 to generate at least one application enhanced imaging application output 306 for the least one domain A application image X 108. The at least one application enhanced imaging application output 306 consists of a trustful score. The trustful score indicates whether the imaging application output is trustworthy or not.

The application enhancement optimizes the domain matching conversion to enhance the compatibility to the imaging application analytics. This results in application enhanced domain converters to assure good application performance of the images after the conversion.

The individual components and/or steps that are specific to the application enhanced domain matching image conversion method will be further explained in the following.

3.1. Application Enhanced Domain Matching Converter Training

The application enhanced domain matching converter can map in both directions (A to B and B to A) between the domain A, in which there may only be a single training image and a domain B, for which there is a richer training set. In one embodiment of the invention, the application enhanced A to B domain matching converter 302 consists of encoders $E_A$, $E_B$ and generators $G_A$, $G_B$. In addition, there are two discriminators $Dr_1$, $Dr_2$ that are created during phase 1 and phase 2 trainings for application enhancements. To apply the application enhanced A to B domain matching converter 302, we first apply $E_A$ to domain A image and then applying $G_B$ to generate application enhanced domain B matched image.

As disclosed previously, to enrich the training sample, the images are augmented through methods such as random rotations and/or translation, etc. for images in domains B and A to create P(S), s $\in$ B and P(x), x $\in$ A. The training includes two phases. In phase 1, the autoencoder for domain B is application enhanced pre-trained using augmented images of P(S). In phase 2, the application enhanced autoencoder for each of the two domains $E_A$, $G_A$, $E_B$, $G_B$ are jointly trained using augmented images P(S) and P(x). The autoencoder for domain B is further trained and a separate autoencoder for domain A, initialized as a clone of the phase 1 pretrained autoencoder of B.

Phase 1 Application Enhanced Training

Figure 4:
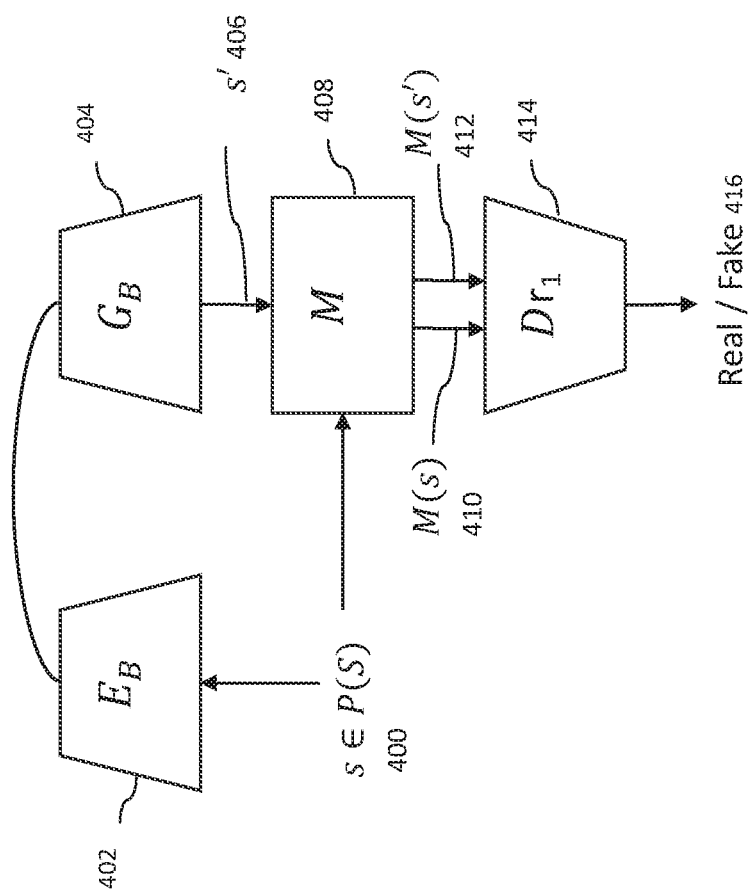
FIG. 4 shows the processing flow of the application enhanced phase 1 domain matching converter training according to the present invention.

The phase 1 application enhanced training generates $E_B$ and $G_B$ with the basic requirement that $\forall\ s \in B$, $s \cong G_B(E_B(s))$. FIG. 4 shows the processing flow of one embodiment of the application enhanced phase 1 domain matching converter training. The augmented domain B training images s $\in$ P(S) 400 where S $\subset$ B are encoded by the encoder $E_B$ 402 and generated by the generator $G_B$ to create auto-converted s, called s' 406. The image application analytics is designated as a functional model M 408. Both s 400 and s' 406 are applied to M 408 to generate image application analytics outputs M(s) 410 and M(s') 412. The discriminator $Dr_1$ 414 is trained to discriminate between the application outputs from real data M(s) 410 and fake data M(s') 412. The real/fake 416 truth is known and provided for discriminator $Dr_1$ 414 training.

The phase 1 training is performed by alternately minimizing $\mathcal{L}^{B+}$ and $\mathcal{L}_{D1}$.

In one embodiment of the invention, the loss function $\mathcal{L}^{B+}$ is the weighted combination of the reconstruction loss $\mathcal{L}_{REC_B}$, the variational loss $\mathcal{L}_{VAE_B}$ and an adversarial loss $\mathcal{L}_{GAN_B}$. That is, $$\mathcal{L}^{B+} = \mathcal{L}_{REC_B} + \lambda_1 \mathcal{L}_{VAE_B} + \lambda_2 \mathcal{L}_{GAN_B}$$

Where $\lambda_1$ and $\lambda_2$ are the weight parameters, and $$\mathcal{L}_{REC_B} = \sum_{s \in P(S)} \| G_B(E_B(s)) - s \|_1$$

$$\mathcal{L}_{VAE_B} = \sum_{s \in P(S)} KL(\{E_B(s) \mid s \in P(S)\} \| \mathcal{N}(0, I))$$

$$\mathcal{L}_{GAN_B} = \sum_{s \in P(S)} \ell(\overline{Dr_1}(\overline{M}(G_B(E_B(s)))), 1)$$

The discriminator loss function is $$\mathcal{L}_{D1} = \sum_{s \in P(S)} [\ell(Dr_1(\overline{M}(\overline{G_B}(\overline{E_B}(s)))), 0) + \ell(Dr_1(\overline{M}(s)), 1)]$$

The loss functions $\ell$ above can be selected from state-of-art functions such as binary cross entropy, least squares loss, Wasserstein loss and relativistic loss, etc.

The bars in above terms indicate that parameters of the networks under the bars are fixed during backpropagation. CNNs can be configured and trained for encoders and generators. In one embodiment of the invention, PatchGAN is used for the discriminator $Dr_1$. Those skilled in the art should recognize that different state-of-the-art CNN architectures (e.g., VGG, ResNet, GoogLeNet, MobileNet, etc.) can be used depending on the memory, speed, and performance requirements.

Phase 2 Application Enhanced Training

Figure 5:
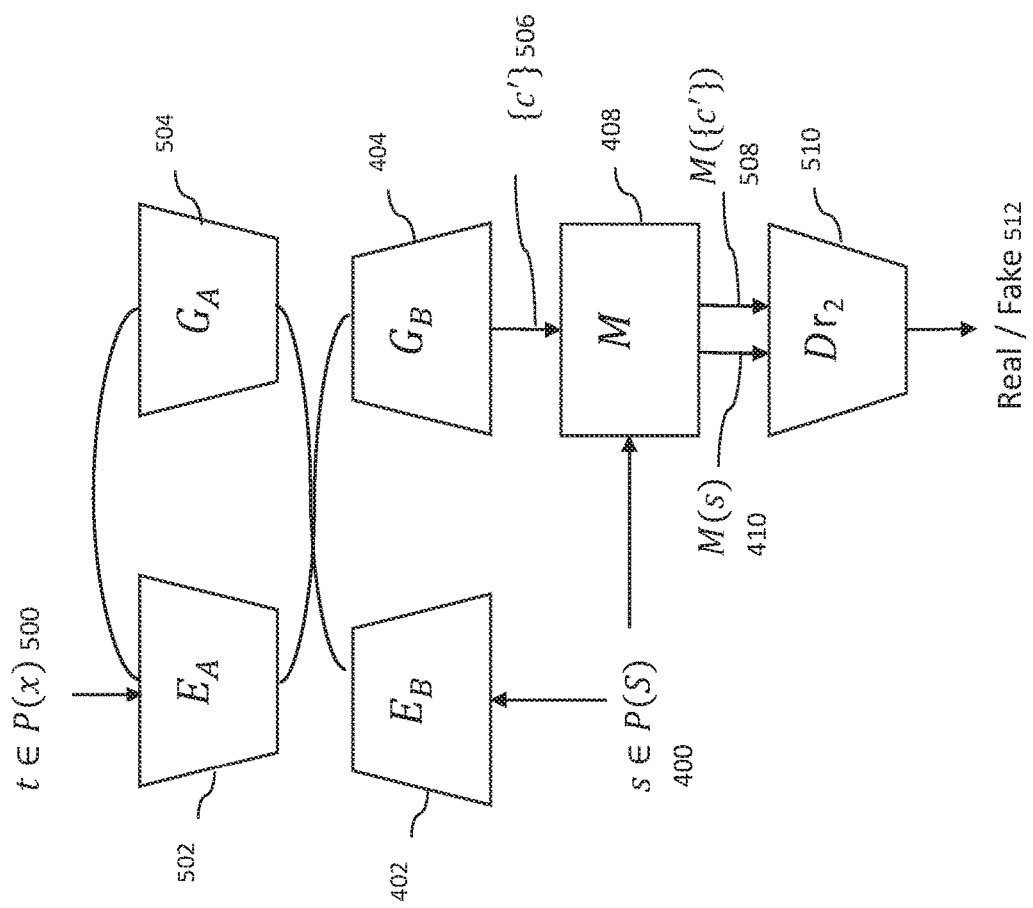
FIG. 5 shows the processing flow of the application enhanced phase 2 domain matching converter training according to the present invention.

The phase 2 trains the autoencoder of domain A jointly with the pretrained autoencoder of domain B. $E_A$ and $G_A$ are initialized with phase 1 created $E_B$ and $G_B$. FIG. 5 shows the processing flow of one embodiment of the application enhanced phase 2 domain matching converter training. The augmented domain B training images $s \in P(S)$ 400 where S $\subset$ B are encoded by the encoder $E_B$ 402 and generated by the generator $G_B$ to create auto-converted s, called s'. The augmented domain A training images $t \in P(x)$ 500 where x $\in$ A are encoded by the encoder $E_A$ 502 and generated by the generator $G_A$ to create auto-converted t, called t'. The s' and t' are collectively called converted images {c'} 506. Both s 400 and {c'} 506 are applied to M 408 to generate image application analytics outputs M(s) 410 and M({c'}) 412. The discriminator $Dr_2$ 510 is trained to discriminate between the application outputs from real data M(s) 410 and fake data M({c'}) 508. The real/fake 512 truth is known and is provided for discriminator $Dr_2$ 510 training. In one embodiment of the invention, $Dr_1$ 414 and $Dr_2$ 510 have the same network architecture and in the beginning of phase 2, $Dr_2$ is initialized to the phase 1 trained $Dr_1$ parameters. In another embodiment of the invention, a single discriminator Dr is used for $Dr_1$ 414 and $Dr_2$ 510. That is, a single Dr is initially trained in phase 1 and continued trained in phase 2.

The phase 2 training is performed by alternately minimizing $\mathcal{L}^{AB+}$ and $\mathcal{L}_{D2}$.

In one embodiment of the invention, the loss function $\mathcal{L}^{AB+}$ is the weighted combination of different loss components $$\mathcal{L}^{AB+} = \mathcal{L}_{REC_B} + \lambda_3 \mathcal{L}_{REC_A} + \lambda_4 \mathcal{L}_{VAE_B} + \lambda_5 \mathcal{L}_{VAE_A} + \lambda_6 \mathcal{L}_{GAN_B} + \lambda_7 \mathcal{L}_{GAN_A} + \lambda_8 \mathcal{L}_{bab\text{-}cycle} + \lambda_9 \mathcal{L}_{aba\text{-}cycle} + \lambda_{10} \mathcal{L}_{f\text{-}cycle}$$

Where $\lambda_i$ are the weight parameters, $\mathcal{L}_{REC_B}$ and $\mathcal{L}_{REC_A}$ are reconstruction losses and $\mathcal{L}_{VAE_B}$ and $\mathcal{L}_{VAE_A}$ are variational losses.

$$\mathcal{L}_{REC_B} = \sum_{s \in P(S)} \| G_B(E_B(s)) - s \|_1,$$

$$\mathcal{L}_{REC_A} = \sum_{t \in P(x)} \| G_A(E_A(t)) - t \|_1$$

$$\mathcal{L}_{VAE_B} = \sum_{s \in P(S)} KL(\{E_B(s) \mid s \in P(S)\} \| \mathcal{N}(0, I)),$$

$$\mathcal{L}_{VAE_A} = \sum_{t \in P(x)} KL(\{E_A(t) \mid t \in P(x)\} \| \mathcal{N}(0, I))$$

The $\mathcal{L}_{GAN_B}$ and $\mathcal{L}_{GAN_A}$ are adversarial losses $$\mathcal{L}_{GAN_B} = \sum_{s \in P(S)} \ell(\overline{Dr_2}(\overline{M}(G_B(E_B(s)))), 1),$$

$$\mathcal{L}_{GAN_A} = \sum_{t \in P(x)} \ell(\overline{Dr_2}(\overline{M}(G_B(E_A(t)))), 1)$$

$\mathcal{L}_{bab\text{-}cycle}$ and $\mathcal{L}_{aba\text{-}cycle}$ are cycle-consistency losses from domain B to domain A and back, and from A to B and back. $\mathcal{L}_{f\text{-}cycle}$ is the feature cycle from the encoded version of samples $s \in B$ to samples in A and back to the latent space.

$$\mathcal{L}_{bab\text{-}cycle} = \sum_{s \in P(S)} \| G_B(\overline{E_A}(\overline{G_A}(E_B(s)))) - s \|_1$$

$$\mathcal{L}_{aba\text{-}cycle} = \sum_{t \in P(x)} \| G_A(\overline{E_B}(\overline{G_B}(E_A(t)))) - t \|_1$$

$$\mathcal{L}_{f\text{-}cycle} = \sum_{s \in P(S)} \| E_A(G_A(\overline{E_B}(s))) - \overline{E_B}(s) \|_1$$

The discriminator loss function is $$\mathcal{L}_{D2} = \sum_{s \in P(S)} [\ell(Dr_2(\overline{M}(\overline{G_B}(\overline{E_B}(s)))), 0) + \ell(Dr_2(\overline{M}(s)), 1)] + \sum_{t \in P(x)} \ell(Dr_2(\overline{M}(\overline{G_B}(\overline{E_A}(t)))), 0)$$

Just like before, the bars in the above terms are used to indicate that these networks are not updated during the backpropogation ("detached") of this loss. Note that no feature loss coming from $x \in A$ is applied. This way the encoder and generator of domain A is trained to adapt to domain B's latent space, and not vice versa. Moreover, during training, we "freeze" the weights of $E_B$ and backprop only through $G_A$ and $E_A$. The selective backpropagation ensures that the encoder and generator of domain A are adapted to the latent space of domain B, and not vice versa. This prevents overfitting by the single or just a few images from the domain A.

3.2. Truthful Scoring

The trustful score is derived by applying the result of the imaging application to the discriminator $Dr_2$ 510. Since $Dr_2$ 510 is trained to discriminate between the application outputs from real data and fake data. The real/fake output of $Dr_2$ can be used as the trustful score. When the score is high, the converted data is predicted to be real which is trustworthy and vice versa.

Figure 6:
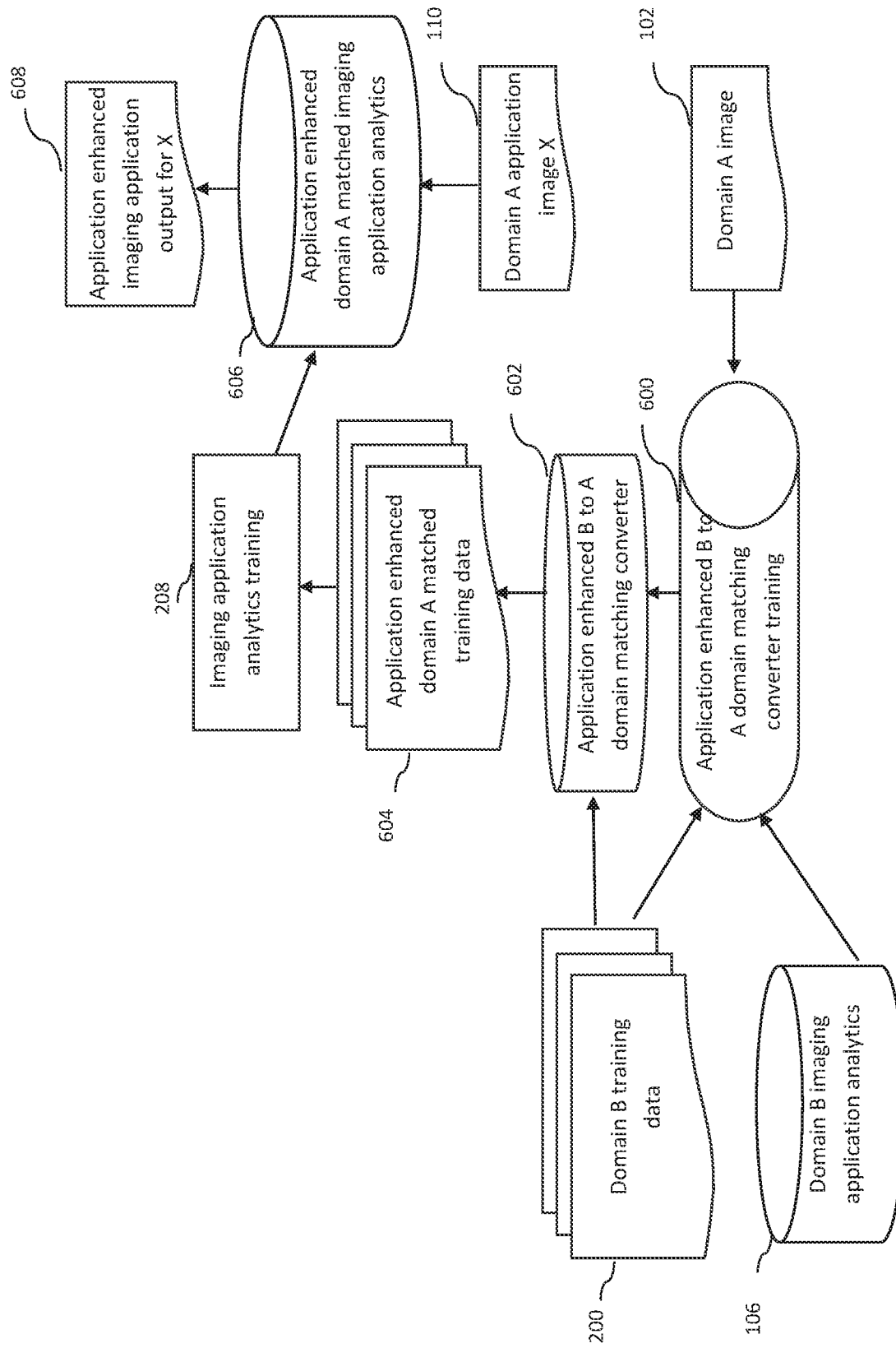
FIG. 6 shows the processing flow of the application enhanced domain matching analytics conversion method for transportable imaging applications according to the present invention.

4. Application Enhanced Domain Matching Analytics Conversion Method for Transportable Imaging Applications FIG. 6 shows the processing flow of the application enhanced domain matching analytics conversion method. A source domain ("domain B") imaging application analytics 106, a plurality of domain B training data 200 and at least one target domain ("domain A") image 102 are entered into electronic storage means. An application enhanced B to A domain matching converter training 600 is performed by computing means using the plurality of domain B training data 200, the domain B imaging application analytics 106 and the at least one domain A image 102 to generate an application enhanced B to A domain matching converter 602. The application enhanced B to A domain matching converter 602 is applied to the plurality of domain B training data 200 to generate a plurality of application enhanced domain A matched training data 604. An imaging application analytics training 208 using the plurality of application enhanced domain A matched training data 604 to generate an application enhanced domain A matched imaging application analytics 606 output. Inputting at least one domain A application image X 110 into electronic storage means and applying the application enhanced domain A matched imaging application analytics 606 to the at least one domain A application image X 110 to generate at least one application enhanced imaging application output 608 for the least one domain A application image X 102.

The domain B training data and the imaging application analytics training are described previously in sections 2.1 and 2.3. The same procedure used for the application enhanced A to B domain matching converter training as described in section 2.1 can also be used for application enhanced B to A domain matching converter training, as the training is bi-directional. After the training, encoders $E_A$, $E_B$ and generators $G_A$, $G_B$ are created. To apply the application enhanced B to A domain matching converter, we first apply $E_B$ to domain B training images contained in the domain B training data 200 and then applying $G_A$ to generate application enhanced domain A matched training images. The domain B training annotation data can usually be directly used in the application enhanced domain A matched training data 604. In some cases, if the annotation data is domain dependent, the application enhanced B to A domain matching converter 602 can also be trained for the annotation data conversion.

The invention has been described herein in considerable detail in order to comply with the Patent Statutes and Rules and to provide those skilled in the art with the information needed to apply the novel principles and to construct and use such specialized components as are required. However, it is to be understood that the invention can be carried out by specifically different equipment and devices, and that various modifications, both as to the equipment details, deep models and imaging analytics and operating procedures, can be accomplished without departing from the scope of the invention.

What is claimed is:

1. A computerized domain matching image conversion method for transportable imaging applications, the method comprising the steps of:
   a) inputting a plurality of source domain B training images and at least one target domain A image into electronic storage means;
   b) performing an A to B domain matching converter training by computing means using the plurality of source domain B training images and the at least one target domain A image to generate an A to B domain matching converter;
   c) inputting a domain B imaging application analytics and at least one domain A application image X into electronic storage means;
   d) applying the A to B domain matching converter to the at least one domain A application image X to generate at least one domain B matched application image; and
   e) applying the domain B imaging application analytics to the at least one domain B matched application image to generate at least one imaging application output for the least one domain A application image X.

2. The computerized domain matching image conversion method of claim 1, wherein the A to B domain matching converter comprises encoders $E_A$, $E_B$ and decoders $D_A$, $D_B$.

3. The computerized domain matching image conversion method of claim 2, wherein the A to B domain matching converter training comprises a first phase and a second phase.

4. The computerized domain matching image conversion method of claim 2, wherein the step of applying the A to B domain matching converter first applies $E_A$ to domain A image and then applies $D_B$ to generate the at least one domain B matched application image.

5. The computerized domain matching image conversion method of claim 3, wherein the first phase of the A to B domain matching converter training trains $E_B$ and $D_B$ using only the plurality of source domain B training images and the second phase of the A to B domain matching converter training simultaneously trains $E_A$, $E_B$ and $D_A$, $D_B$.

6. The computerized domain matching image conversion method of claim 5, wherein the second phase of the A to B domain matching converter training uses at least one cycle-consistency loss function.

7. A computerized domain matching analytics creation method for transportable imaging applications, the method comprising the steps of:
   a) inputting a plurality of source domain B training data and at least one target domain A image into electronic storage means;
   b) performing a B to A domain matching converter training by computing means using the plurality of source domain B training data and the at least one target domain A image to generate an B to A domain matching converter;
   c) applying the B to A domain matching converter to the plurality of source domain B training data to generate a plurality of domain A matched training data; and
   d) applying imaging application analytics training using the plurality of domain A matched training data to generate a domain A matched imaging application analytics.

8. The computerized domain matching analytics creation method of claim 7, further comprising the steps of:
   a) inputting at least one domain A application image X into electronic storage means; and
   b) applying the domain A matched imaging application analytics to the at least one domain A application image X to generate at least one imaging application output for the least one domain A application image X.

9. The computerized domain matching analytics creation method of claim 7, wherein the B to A domain matching converter comprises encoders $E_A$, $E_B$ and decoders $D_A$, $D_B$.

10. The computerized domain matching analytics creation method of claim 9, wherein the B to A domain matching converter training comprises a first phase and a second phase.

11. The computerized domain matching analytics creation method of claim 9, wherein the step of applying the B to A domain matching converter first applies $E_B$ to domain B data and then applies $D_A$ to generate the plurality of domain A matched training data.

12. The computerized domain matching analytics creation method of claim 10, wherein the first phase of the B to A domain matching converter training trains $E_B$ and $D_B$ using only the plurality of source domain B training data and the second phase of the B to A domain matching converter training simultaneously trains $E_A$, $E_B$ and $D_A$, $D_B$.

13. The computerized domain matching analytics creation method of claim 12, wherein the second phase of the B to A domain matching converter training uses at least one cycle-consistency loss function.

14. A computerized application enhanced domain matching image conversion method for transportable imaging applications, the method comprising the steps of:
   a) inputting a source domain B imaging application analytics, a plurality of domain B training images and at least one target domain A image into electronic storage means;
   b) performing an application enhanced A to B domain matching converter training by computing means using the plurality of domain B training images, the source domain B imaging application analytics and the at least one target domain A image to generate an application enhanced A to B domain matching converter;
   c) inputting at least one domain A application image X into electronic storage means;
   d) applying the application enhanced A to B domain matching converter to the at least one domain A application image X to generate at least one application enhanced domain B matched application image; and
   e) applying the source domain B imaging application analytics to the at least one application enhanced domain B matched application image to generate at least one application enhanced imaging application output for the least one domain A application image X.

15. The computerized application enhanced domain matching image conversion method of claim 14, wherein the application enhanced A to B domain matching converter comprises encoders $E_A$, $E_B$, generators $G_A$, $G_B$ and discriminators $Dr_1$ and $Dr_2$.

16. The computerized application enhanced domain matching image conversion method of claim 15, wherein the application enhanced A to B domain matching converter training comprises a first phase and a second phase.

17. The computerized application enhanced domain matching image conversion method of claim 16, wherein the first phase of the application enhanced A to B domain matching converter training trains $E_B$, $G_B$ and $Dr_1$ using only the plurality of domain B training images and the second phase of the application enhanced A to B domain matching converter training simultaneously trains $E_A$, $E_B$, $G_A$, $G_B$ and $Dr_2$.

18. The computerized application enhanced domain matching image conversion method of claim 15, wherein the at least one imaging application output for the least one domain A application image X comprises a trustful score generated from applying $Dr_2$.

19. A computerized application enhanced domain matching analytics conversion method for transportable imaging applications, the method comprising the steps of:
   a) inputting a source domain B imaging application analytics, a plurality of domain B training data and at least one target domain A image into electronic storage means;
   b) performing an application enhanced B to A domain matching converter training by computing means using the plurality of domain B training data, the source domain B imaging application analytics and the at least one target domain A image to generate an application enhanced B to A domain matching converter;
   c) applying the application enhanced B to A domain matching converter to the plurality of domain B training data to generate a plurality of application enhanced domain A matched training data; and
   d) applying imaging application analytics training using the plurality of application enhanced domain A matched training data to generate an application enhanced domain A matched imaging application analytics.

20. The computerized application enhanced domain matching analytics conversion method of claim 19, further comprising the steps of:
   a) inputting at least one domain A application image X into electronic storage means; and
   b) applying the application enhanced domain A matched imaging application analytics to the at least one domain A application image X to generate at least one application enhanced imaging application output for the least one domain A application image X.

21. The computerized application enhanced domain matching analytics conversion method of claim 19, wherein the application enhanced B to A domain matching converter comprises encoders $E_A$, $E_B$, generators $G_A$, $G_B$ and discriminators $Dr_1$, $Dr_2$.

22. The computerized application enhanced domain matching analytics conversion method of claim 21, wherein the application enhanced B to A domain matching converter training comprises a first phase and a second phase.

23. The computerized application enhanced domain matching analytics conversion method of claim 22, wherein the first phase of the application enhanced B to A domain matching converter training trains $E_B$, $G_B$ and $Dr_1$ using only the plurality of domain B training data and the second phase of the application enhanced B to A domain matching converter training simultaneously trains $E_A$, $E_B$, $G_A$, $G_B$ and $Dr_2$.

* * * * *